UNITED STATES PATENT OFFICE.

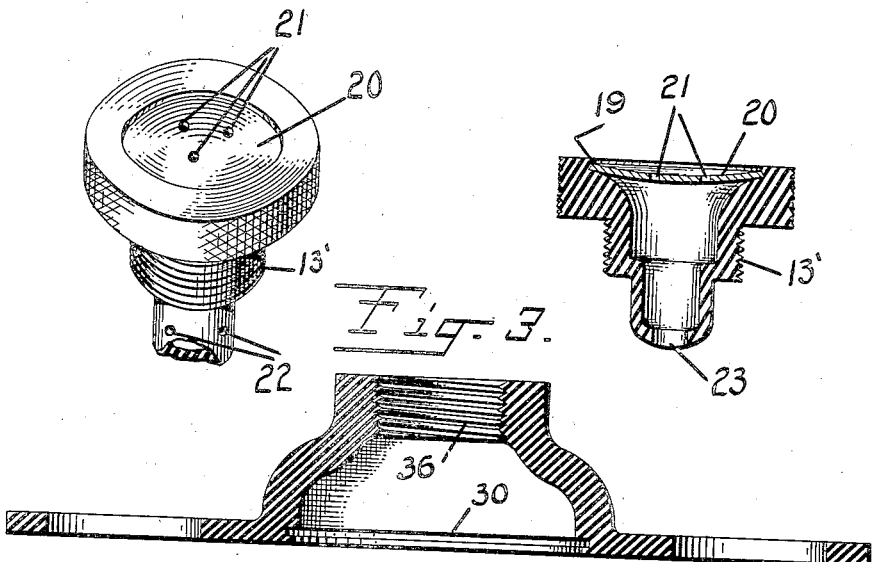

HARRY WEIDA, OF HIGHLAND PARK, NEW JERSEY, ASSIGNOR TO INDIA RUBBER COMPANY, A CORPORATION OF NEW JERSEY.

MOLDED RUBBER ARTICLE.

1,373,472.  Specification of Letters Patent.  Patented Apr. 5, 1921.

Application filed November 19, 1915. Serial No. 62,343.

*To all whom it may concern:*

Be it known that I, HARRY WEIDA, a citizen of the United States, and a resident of Highland Park, county of Middlesex, and State of New Jersey, have invented certain new and useful Improvements in Molded Rubber Articles, of which the following is a full, clear, and exact description.

This invention relates to molded articles formed of vulcanizable plastic such as rubber and has for an object to produce a molded article of this character having an interior cavity symmetrically located with respect to the axis of the article. A further object is to provide a novel method of making articles of this character so that waste due to defective product, as well as imperfections and flaws in the product, will be positively obviated.

The invention will be described in connection with the manufacture of hard rubber battery vents as an example of one embodiment of the invention.

Hard rubber battery vents now in common use are formed and vulcanized in a two-part mold, the joint between the mold sections being parallel with the central axis of the rubber article. To produce a clean impression from the mold on the exterior surface of the article, and to form a chamber in the interior of the article, it is the present practice to inclose in the unvulcanized stock when it is placed in the mold, a small amount of water or other medium. When the mold sections are heated to vulcanize the article, this medium vaporizes, and the expansion resulting therefrom forces the mobile material against the walls of the mold, and at the same time forms the chamber in the interior.

A disadvantage resulting from this practice is that the joint between the mold sections forms a flash along both sides of the article, and since in some cases the article so formed has a thread molded thereon, this flash consequently forms an obstruction which impairs the operativeness of the article necessitating scrapping the same. Also the mold sections may be so joined together that the threaded portions are slightly out of register, this again resulting in the production of an article which is absolutely useless. Furthermore as is obvious, the expansion of the contained vaporizing medium cannot be controlled as to direction and hence the chamber in the interior of the article formed by the vapor pressure is not uniform in size and is not symmetrically located with respect to the axis of the article, the result being that the shell like article is thinner at some places and consequently weaker thereat than at others, and hence is imperfect.

The present invention provides a molded battery vent having a uniform, symmetrically located interior chamber in all instances, and in certain articles where an attaching thread is produced, the thread will be uninterrupted in continuity and devoid of flash.

The invention can be readily understood from the following description taken in connection with the accompanying drawing, in which—

Figure 1 is a perspective view of a vent plug embodying my improvements;

Fig. 2 is a longitudinal sectional view through a slightly modified form of vent plug;

Fig. 3 is a longitudinal sectional view through a vent cover made in accordance with my invention;

Fig. 4 is a reduced sectional view showing the method of molding the vent plug;

Fig. 5 is a reduced sectional view showing the method of molding the vent cover.

To make my improved vent plug, constituting one type of battery vent, the rubber stock 10 suitable for producing the rubber article is placed around a core 11, having a body portion symmetrically disposed with respect to the axis of the core, and of a shape to impart the desired shape to the chamber of the plug. The core with the stock thereon is then forced into a mold section 12 which has a concavity, of suitable shape to form the lower exterior surface of the plug, the applied pressure driving the stock in all directions into intimate contact with the surface of the concavity. In the present embodiment the concavity is formed with threads 13 which produce counterpart threads 13′ on the exterior of the plug, by means of which the plug may be screwed into a threaded opening in the battery jar cover itself or into a threaded opening in the vent cover which will be presently described. The companion section 14 of the mold is now closed upon the section containing the core and stock, said companion section having a concavity 15 shaped to form the upper exterior surface of the plug, as shown. The said section is provided with an opening 16 which receives the stem 17 of the core, and centers the core so that its longitudinal axis coincides with the longitudinal axis of the concavities in the mold sections. The core furthermore is formed upon its exterior surface with a relatively thin flange 18 which produces in the wall of the chamber formed by the core an interior groove 19 of uninterrupted continuity concentric with the axis of the core.

The rubber article thus confined in the mold around the core is vulcanized in the usual or any preferred manner. When the vulcanization is complete the mold section 14 is removed. The core with the vulcanized shell like plug thereon is now removed from the mold section 12 by unscrewing as a unit therefrom, since the joint between the mold sections 12 and 14 is above and at a right angle to the axis of the threaded portion of the plug, the thread on the plug will be maintained intact during removal and will be devoid of any longitudinal ridge or flash. The core is now withdrawn or may be withdrawn prior to removal of the vulcanized plug from the mold section 12, if desired. Removal of the core is affected by a direct outward pull performed before the stock has had time to cool after vulcanization, the warm stock above the groove 19 yielding freely and permitting withdrawal of the core, and immediately returning to place and becoming rigid upon cooling of the stock.

As a closure for the opening at the top of the shell like plug thus formed, a disk 20 is cut from sheeted rubber stock, or other suitable material to fit within the circular groove 19 of the plug and is sprung into place therein. The disk is preferably provided with vent openings 21, as is also the plug, the same being either disposed in the sides as shown at 22 or in coincidence with the axis of the plug as shown at 23, the vent openings of the plug permitting of the froth, foam, or the like, which rises from batteries, escaping into the interior chamber in the plug in the usual manner, and there bursting the gases, escaping through the vent openings 21 in the closure, and the liquid draining back into the battery through the vent openings in the plug.

In forming the vent covers, the above described method is carried out, that is, stock 24 sufficient for the body of the article is placed around a core 25 and then forced into the concavity 26 in a mold section 27, the core having as above described an exterior circular rib 28 which forms a groove 29 in the vent cover for the reception of the disk closure 30. The companion mold section 31 in this instance is formed without openings other than an opening 32 for the reception of the centralizing stem 33 of the core, this stem in the present embodiment being shown at 34 as continuing through an opening 35 in the mold section 27 to produce a symmetrical article. In this instance the attaching thread 36 may be tapped in the article after the same has been vulcanized, but threads may be formed on the stem 33' of the core to produce their counterpart in the article, if desired. These threads may receive the threaded portion of the above described vent plug, or may receive a plug of other construction than the one above described.

From the above description it will be seen that in all instances the battery vent, whether a plug, or a cover, is provided with an interior chamber which is symmetrically located with respect to the axis of the article, and consequently the article will be of any desired thickness throughout and will therefore be devoid of flaws or weak places. If desired the exterior of the vent plug may be knurled or otherwise roughened to provide a better grip when inserting or removing it from the battery cover or from the vent cover above described or from a vent cover of other construction than above described. By virtue of the thread on the vent plug, and also the thread on the vent cover, being continuous and uninterrupted, application and removal of the plug may be affected smoothly and without danger of breaking either of the parts.

When in the following claims I use the term "battery vent" I mean the same to include both a vent plug and a vent cover, it being simply necessary to the practice of my invention that a battery vent of any type whatever be molded and exhibit an interior chamber which is substantially closed by a diaphragm, of hard rubber or the like, and which is in communication with the interior and exterior of the battery through unobstructed apertures whereby a trapped mixture of fluid and gases may be separated, the fluid draining back into the battery, and the gases passing out of the vent into the atmosphere.

What I claimed is:

1. A rubber battery vent having a one-piece socketed and threaded body, and a diaphragm, said body being shaped to frictionally grip and retain said diaphragm, and both said body and diaphragm having one or more unobstructed apertures permitting escape of gases at all times.

2. A vulcanized battery vent of cellular form having a body and a resilient diaphragm both of which are formed of separate pieces of hard rubber, said body being provided with a seat adapted to retain said diaphragm, and both said body and seat being apertured to pass gases.

3. A battery vent having a molded body provided externally with threads and internally with a socket, and a separately formed diaphragm, said body having a seat at the mouth of the socket for retention of said diaphragm in a position covering said socket, and said body and diaphragm being provided with apertures for passing gases.

4. A battery vent having a hollow molded body, and a diaphragm gripped peripherally by said body to form a substantially closed internal chamber, said vent being provided with unobstructed apertures whereby gases and fluid may be trapped in the chamber and the gases allowed to escape at all times to the outside of the battery.

Signed at New Brunswick, N. J., this 11th day of November, 1915.

HARRY WEIDA.